J. S. McFEETERS.
MACHINE FOR SAWING FELLOES.

No. 173,657. Patented Feb. 15, 1876.

WITNESSES
Franck L. Durand
C. L. Eueh.

INVENTOR
J. S. McFeeters.
By Alexander Mason
Attorneys

UNITED STATES PATENT OFFICE.

JAMES S. McFEETERS, OF BEDFORD, INDIANA.

IMPROVEMENT IN MACHINES FOR SAWING FELLIES.

Specification forming part of Letters Patent No. 173,657, dated February 15, 1876; application filed January 22, 1876.

*To all whom it may concern:*

Be it known that I, JAMES S. MCFEETERS, of Bedford, in the county of Lawrence and in the State of Indiana, have invented certain new and useful Improvements in Machines for Sawing Fellies; and do hereby declare that the following is a full, clear, and exact description thereof, reference being had to the accompanying drawings, and to the letters of reference marked thereon, making a part of this specification.

The nature of my invention consists in the construction and arrangement of an attachment for band or jig saws for cutting fellies for wheels or other curved articles, as will be hereinafter more fully set forth.

In order to enable others skilled in the art to which my invention appertains to make and use the same, I will now proceed to describe its construction and operation, referring to the annexed drawing, in which—

Figure 1:
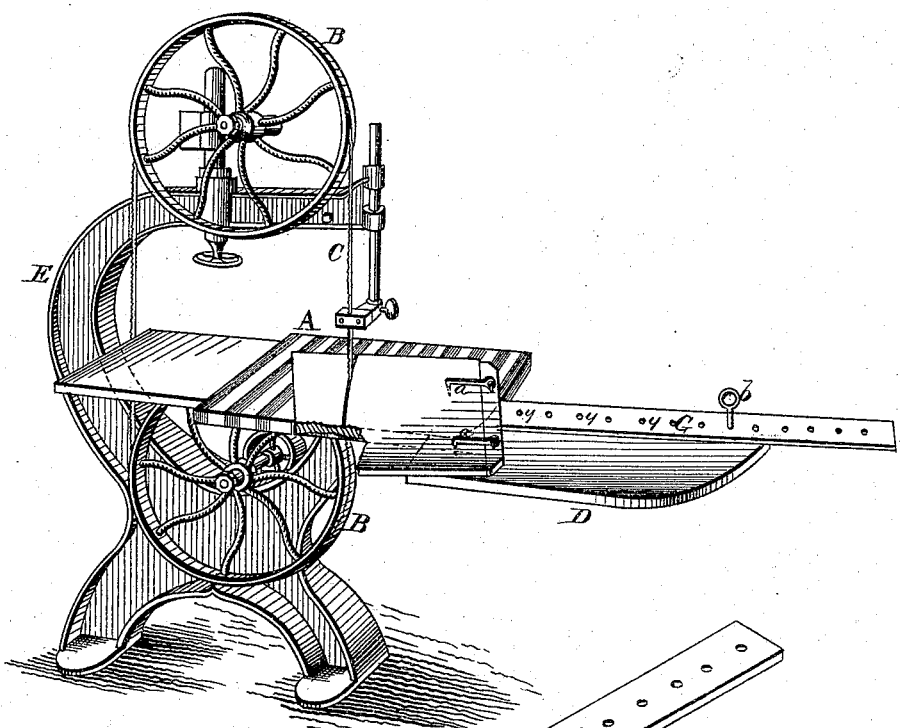
Figure 2:
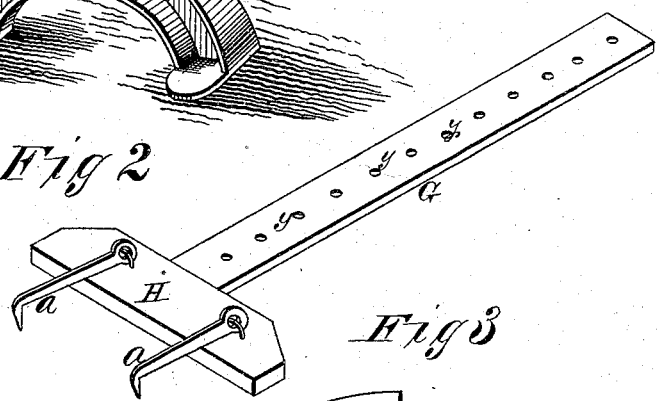
Figure 3:
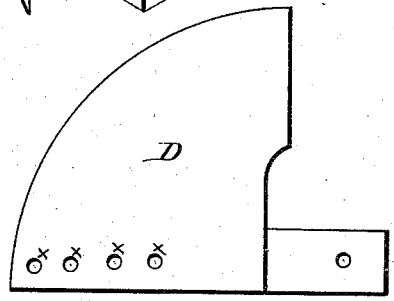

Figure 1 is a perspective view of a band-saw machine with my attachment connected thereto. Figs. 2 and 3 are detailed perspective views of the attachments.

A represents the table of a band-saw machine; B B, the pulleys over which the saw C passes; and E is the frame or standard of said machine. To the table A is attached an extension, D, which is provided with a series of holes, $x\ x$, on a straight line and in a line with the point in the table A where the saw passes through it. G is a flat metal bar, provided with a series of holes, $y\ y$, on a straight line through the center of the bar. At the inner end of the metal bar G is attached a head, H, having two dogs, $a\ a$, as shown.

The lumber from which the fellies are to be cut is laid upon the table A, and held to the head H by the dogs $a$. The bar G is then pivoted to the table-extension D by a pin, $b$, passing through one of the holes $y$ in the bar and one of the holes $x$ in said table-extension. The bar G and head H then form a sweep, to which the lumber is held by the dogs $a$, and which swings or turns on the pin $b$ as a pivot, so that the saw will cut the outer side of the felly. The sweep is then moved inward on the table D; that is, the pin $b$ passes through the same hole, $y$, in the bar G, but through one of the holes $x$, farther in on the table, making the circle that much smaller, when the saw will cut the inner curve of the felly. The next felly is cut in the same manner, taking care that the circles are the same size as the first ones. By this means very little waste is had.

These attachments may be used on a jig-saw as well as on a band-saw, and other articles may be cut in curved form as well as fellies.

Having thus fully described my invention, what I claim as new, and desire to secure by Letters Patent, is—

In combination with the detachable table-extension D, having perforations $x$, I claim the perforated sweep G, having hinged dogs $a\ a$, connected to the head H, as and for the purposes herein set forth.

In testimony that I claim the foregoing I have hereunto set my hand this 31st day of December, 1875.

JAMES S. McFEETERS.

Witnesses:
   JOHN RILEY,
   WILLIAM H. EDWARDS.